Patented Feb. 19, 1924.

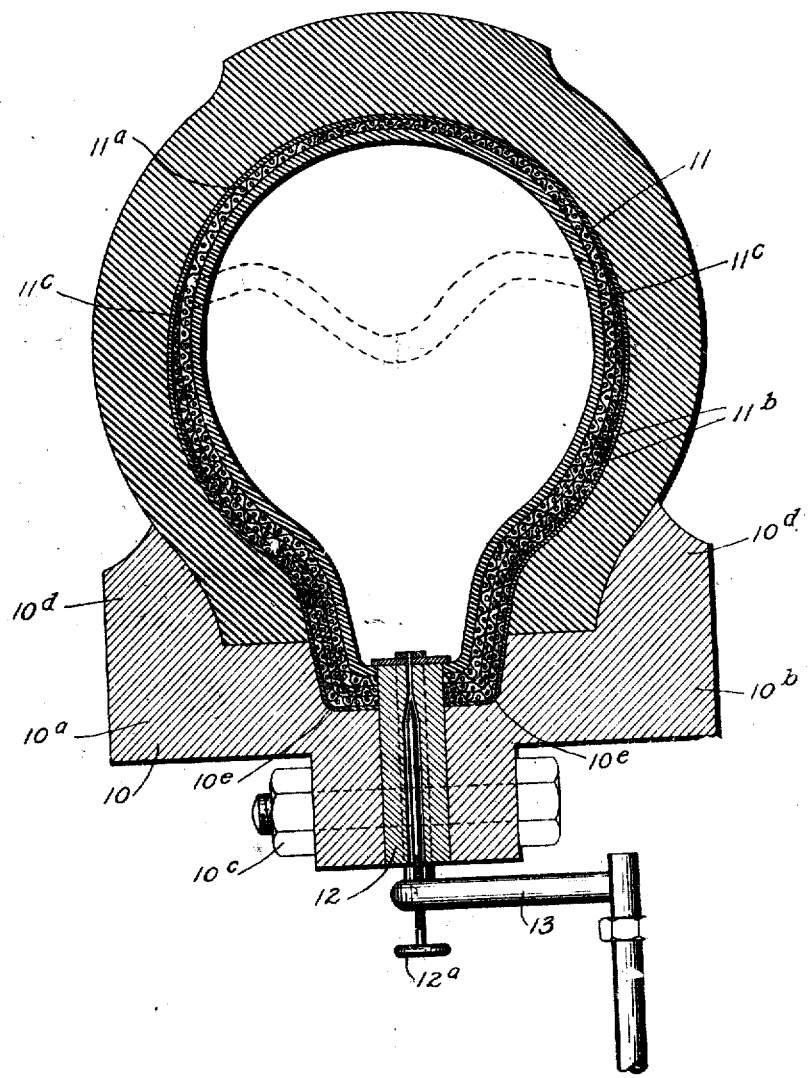

1,484,407

UNITED STATES PATENT OFFICE.

JOHN FULLERTON PALMER, OF ST. JOSEPH, MICHIGAN.

AIR BAG FOR USE IN THE MANUFACTURE OF PNEUMATIC TIRES.

Application filed March 6, 1920. Serial No. 363,909.

*To all whom it may concern:*

Be it known that I, JOHN FULLERTON PALMER, a citizen of the United States, residing at St. Joseph, in the county of Berrien and State of Michigan, have invented certain new and useful Improvements in Air Bags for Use in the Manufacture of Pneumatic Tires, of which the following is a specification.

This invention relates to improvements in apparatus or appliances for the manufacture of pneumatic tires of the type known as double tube tires. It is well known in tires of this type the casing or outer part thereof is separate from the inner tube and is U-shaped in cross-section, the edges of this outer casing being adapted to engage with or in a wheel rim. Stated more particularly, the invention relates to apparatus for securing better results in the vulcanizing of outer casings of the type referred to.

It is common practice in the manufacture of tires, especially cord tires, to expand the tire, in the process of final vulcanization, to a predetermined degree, usually by what is termed an air bag, the latter constituting a smooth surfaced, flexible, expansible and symmetrical agent for the purpose, the use of which tends to expand the tire symmetrically as a whole though not rigidly so. These air bags, as now commonly constructed and employed, are to a certain degree objectionable, in that they do not expand equally in all directions, but are limited in their action by the assembly of the cords or yarn going to make up the fabric which constitutes the strain-resisting part of the tube or air bag. It is the purpose of the present invention to provide an air bag of the type described which will not only expand uniformly in all directions, but one which is also adapted to co-operate with the bead-forming rings at the inner periphery of the tire as a compacting member of the mold assembly. To this end an air tube of rubber or the like is provided, which is preferably surrounded with one or more plies or layers of a knit fabric the chief characteristic of which is its uniform expansibility in all directions, and superimpose upon this fabric reinforcing layers of ordinary woven tire fabric bias cut to suitable width, frictioned and applied to the inner periphery of the air bag and extending up on either side a predetermined distance but not over the tread surface or the outer periphery of the bag. In other words, the only fabric member of the air bag which extends over the tread surface is the knit fabric which, under pressure introduced into the bag, is capable of expanding both longitudinally and transversely at the same time.

In order that the lower part of the air bag may constitute a compacting member in the mold assembly, the bag is made of a size so that the inner periphery thereof, when in position within a tire casing, projects beyond the inner periphery of said casing a sufficient distance so that the inner periphery of the bag, or that portion thereof which lies adjacent the bead-forming flanges of the bead rings, will be free to expand transversely and thus to press the edges of the casing into firm engagement with said flanges upon introduction of pressure into the bag. It will be apparent, of course, that the bead-forming rings or other parts of the mold assembly at the point where the bag projects beyond the inner periphery of the casing must be recessed or otherwise designed to receive this projecting portion.

A further object of my invention is to provide means whereby, after the tube or air bag is once used, it may be readily withdrawn from the finished casing and introduced into an unfinished one. In the present practice the bags become more or less set in their distended condition after they have once been subjected to pressure and the heat of vulcanization, and owing to this it is rather difficult to remove a bag from a finished casing without injury to the former. Furthermore, should the bag be removed without injury, it almost invariably results, upon attempting to introduce it into a new, unvulcanized casing, that the bag, owing to its enlarged condition, wrinkles or becomes otherwise distorted in the process. To obviate this I provide in the tread portion of the bag a knit fabric which reinforces said tread and which also permits of the same being collapsed into the interior of the bag upon the withdrawal of the air therefrom. This reduces the outer circumference of the bag to a point where it is easy to remove the same and to later introduce it into a new, unvulcanized tire without distortion.

In the sectional view disclosed in the single figure of the drawings, an outer casing is shown mounted on bead-forming rings and the air bag is shown in position within the casing. In the drawings the bead-forming ring is designated in its entirety as 10, and comprises the usual complementary sections 10ª and 10ᵇ, designed to be secured together as at 10ᶜ for the purpose of providing an annulus adapted to support the outer casing of the tire during the process of vulcanization. Around the outer edge of each of the sections 10ª and 10ᵇ there is provided the usual outstanding bead-forming flanges 10ᵈ, designed to engage the sides of the casing adjacent its inner periphery and to form, with the aid of the air-bag, the beads on the inner edges of the casing to conform to the usual rimmed contour for the type of tire illustrated.

Mounted within the outer casing is the air bag 11, said bag being provided with the usual nipple 12 having a passage extending therethrough for the admission of fluid under pressure into the bag when it is desired to expand the same. Connected with the nipple at its outer end there may be a pipe line 13 through which air or other fluid may be either supplied to the bag or withdrawn therefrom after the vulcanization. A suitable valve 12ª is provided in the passage of the nipple 12, so that the flow of fluid therethrough may be controlled.

According to the present invention, the air bag is comprised of a tube of rubber surrounded by or having imbedded therein a strip or layer of knit fabric 11ª, this fabric being so formed as to be expansible at the same time both longitudinally and transversely, so that upon the admission of fluid under pressure into the bag a substantially uniform expansion and application of pressure to the outer casing is obtained. Around the inner periphery of the air bag one or more layers or plies of woven fabric 11ᵇ are provided, these elements providing a more rigid structure where applied and extending up on either side of the bag a predetermined distance but terminating short of the outer periphery or tread surface thereof, as shown at 11ᶜ in the drawings. In this manner an air bag is provided the outer periphery of which is expansible and pliable or flexible to a rather marked degree, while the inner periphery thereof is of a stiffer character, owing to the plies or layers of reinforcing material 11ᵇ. Accordingly, after the bag has been inflated in order to expand the casing during the process of vulcanization, the outer periphery of the bag may be collapsed, as shown in dotted lines in the drawings, by merely withdrawing the air from the bag and creating a partial vacuum therein. During this collapsing of the bag along its outer periphery, however, the walls thereof, in which is vulcanized the reinforcing layers, remain substantially in their normal, outwardly curved positions, substantially as shown in the drawings. In this manner the outer circumference of the bag may be materially reduced to aid in removing the same and to also enable the same to be readily and quickly inserted in another unvulcanized casing.

As above outlined, it is preferred to construct bags in accordance with the present improvements in suchwise that when placed within a casing the inner periphery of the bag will project a certain degree beyond the bead line or inner edges of the casing, in order that the air bag may constitute a compacting member in the mold assembly. As now constructed, the inner peripheries of bags of this character terminate in line with the inner periphery or bead line of the casing, or substantially so, so that upon the admission of fluid under pressure into the bags the transverse expansion of the latter at the base of the bead-forming flanges is materially retarded or limited, thus rendering the bags at this point ineffective to a marked degree as compacting members in the bead-forming assembly. In the accompanying drawings the bag of the present improvements is shown, as above indicated, extending beyond the inner periphery of the casing, the bead-forming rings being recessed as at 10ᵉ to receive the protruding portion of the bag. By this construction and relative arrangement of parts, when the bag is expanded, the portions thereof in the vicinity of the bead-forming flanges will expand in substantially the same proportion as the other parts of the bag and will serve to press the edges of the casing firmly against said flanges.

As the present improvements relate to the composition, construction and mounting of the air bag for use during the process of vulcanization in the particular connection herein described, the mold used in such connection has not been illustrated. Its use and relative arrangement, however, will be clearly understood by those skilled in the art.

From the above it will be observed that an air bag of the type described has been provided comprised of rubber and fabric so assembled that substantially uniform expansion is obtainable. It will be further observed that an air bag has been designed the outer periphery of which will, upon the creation of a partial vacuum within said bag, be collapsed while the inner periphery thereof, containing the reinforcing layers, will remain substantially in its normal, outwardly curved condition. By reason of this semi-collapsible feature, the bag may be easily withdrawn from a vulcanized casing and readily and quickly positioned within a raw casing. It will be further observed that by recessing the bead-forming rings and providing a bag which protrudes beyond the inner periphery of the casing further advantages are obtainable, as compared with air bags such as now commonly employed, the chief advantage presented by this feature residing in the freedom with which the inner periphery of the bag may expand transversely in the vicinity of the beads so that the bag at this point co-operates with the bead-forming flanges in the nature of a compacting member and serves to firmly press the inner edges of the casing against said flanges. Another important advantage incidental to the recessing of the bead-forming rings for receiving the inner periphery of the air bag is that in this manner the bag, upon each inflation thereof, is mechanically and positively alined relative to the casing and particularly with respect to the sides thereof in the vicinity of the beaded edges. This feature has been found in practice to be advantageous and is not obtainable with air bags as now constructed and used.

It will be obvious to those skilled in the art that various changes and modifications may be made in the present improvements without departing from the spirit of the invention, and accordingly it is not desired to limit the same except where limitations appear in the appended claims.

I claim:

1. In an apparatus of the type described, an air bag by means of which fluid pressure may be applied to the interior of a tire casing during the process of vulcanizing, said bag comprising a fabric carcass expansible in all directions and reinforcing layers extending around the inner periphery of said bag and over a substantial portion of the side walls thereof, but terminating short of its outer periphery whereby the latter only will be collapsed upon the creation of a partial vacuum within said bag.

2. A tubular air bag of the type described comprised of rubber having imbedded therein a carcass of fabric expansible in all directions and a superimposed layer of reinforcing material applied to the inner periphery of said bag.

3. A tubular air bag of the type described having a relatively thin outer peripheral portion expansible simultaneously in all directions and relatively thick reinforced laterally expansible side walls.

4. An expansible air bag of the type described comprised of rubber having a layer of fabric expansible in all directions imbedded therein over the outer periphery thereof and relatively inexpansible reinforcing material surrounding the inner periphery thereof.

5. An air bag of the type described comprising a tube of rubber having imbedded therein a knit fabric expansible in all directions and superimposed reinforcing strips applied to the inner periphery of said bag and terminating on either side thereof.

In testimony whereof, I have subscribed my name.

JOHN FULLERTON PALMER.